(12) United States Patent  
Maeda

(10) Patent No.: US 7,281,884 B2  
(45) Date of Patent: Oct. 16, 2007

(54) THROW-AWAY INSERT AND MILLING CUTTER USING A THROW-AWAY INSERT

(75) Inventor: Kazuo Maeda, Itami (JP)

(73) Assignee: Sumitomo Electric Hardmetal, Corp., Itami-shi, Hyogo (JP)

( * ) Notice: Subject to any disclaimer, the term of this patent is extended or adjusted under 35 U.S.C. 154(b) by 0 days.

(21) Appl. No.: 11/462,893

(22) Filed: Aug. 7, 2006

(65) Prior Publication Data

US 2007/0031201 A1    Feb. 8, 2007

(30) Foreign Application Priority Data

Aug. 8, 2005    (JP)    ............................... 2005-229743

(51) Int. Cl.  
*B23C 5/20*    (2006.01)

(52) U.S. Cl. ............................ 407/113; 407/42; 407/48

(58) Field of Classification Search ................ 407/113, 407/48, 42; *B23C 5/20*  
See application file for complete search history.

(56) References Cited

U.S. PATENT DOCUMENTS

| | | | | |
|---|---|---|---|---|
| 5,078,550 A | * | 1/1992 | Satran et al. | ................. 407/34 |
| 5,145,295 A | * | 9/1992 | Satran | ........................ 407/113 |
| 5,947,650 A | * | 9/1999 | Satran et al. | ............... 407/113 |
| 6,193,446 B1 | * | 2/2001 | Astrom et al. | .............. 407/114 |
| 6,196,770 B1 | * | 3/2001 | Astrom et al. | ................ 407/40 |
| 6,503,028 B1 | * | 1/2003 | Wallstrom | .................... 407/35 |
| 6,929,427 B2 | * | 8/2005 | Satran | ......................... 407/42 |
| 7,040,844 B1 | * | 5/2006 | Daiguji | ...................... 407/113 |
| 2004/0131431 A1 | * | 7/2004 | Satran | ......................... 407/40 |

FOREIGN PATENT DOCUMENTS

| | | |
|---|---|---|
| EP | 0 585 800 A1 | 3/1994 |
| EP | 0 956 921 A2 | 11/1999 |
| EP | 1 344 595 A2 | 9/2003 |
| EP | 06254146.1 | 2/2007 |
| JP | 11-333616 A | 12/1999 |

* cited by examiner

*Primary Examiner*—Monica Carter  
*Assistant Examiner*—Sara Addisu  
(74) *Attorney, Agent, or Firm*—Ditthavong Mori & Steiner, P.C.

(57) ABSTRACT

A throw-away insert includes: an upper surface; a bottom surface; two side surfaces formed with upper side surfaces and lower side surfaces; two end surfaces; four nose sections formed at the corners of the upper surface; a main cutting section formed from a ridge line positioned at the intersection between the upper side surface and the upper surface; a secondary cutting section formed from a linear ridge line positioned at the intersection between the end surface and the upper surface; and an axial support surface formed from a section of the end surface. The upper side surface is projected outward more than the lower side surface.

5 Claims, 10 Drawing Sheets

THROW-AWAY INSERT AND MILLING CUTTER USING A THROW-AWAY INSERT

INCORPORATION BY REFERENCE

The present application claims priority under 35 U.S.C. § 119 to Japanese Patent Application No. 2005-229743 filed on Aug. 8, 2005. The content of the application is incorporated herein by reference in its entirety.

BACKGROUND OF THE INVENTION

1. Field of the Invention

The present invention relates to a throw-away insert used in the milling of right-angle corners and the like and a milling cutter, e.g., an end mill or corner mill, that uses this insert.

2. Description of the Background Art

Japanese Laid-Open Patent Publication Number Hei 11-333616 describes an example of a throw-away insert (also referred to below simply as insert) used with negative/positive orientation to cut right-angle corners. Negative/positive orientation refers to mounting an insert so that a radial rake of the insert is negative and the axial rake is positive.

In the insert disclosed in Japanese Laid-Open Patent Publication Number Hei 11-333616, the upper surface forms a roughly rectangular shape. A ridge line positioned at the intersection of a side surface and an upper surface serves as a main cutting section, and an end surface of a sloped surface axially projected from an end of a body serves as a secondary cutting section. An upper side section of the side surface that forms the main cutting section with the upper surface is shaped in a wave shape to form a main relief face. A lower side section forming a second relief face forms relief angles that change from the starting point to the end point.

The insert of Japanese Laid-open Patent Publication number Hei 11-333616 is mounted in a cutter body so that an end surface of a sloped surface projected axially from the end of the body and the surface of the torsional lower side section of the side surface are secured. However, the lower side section of the side surface with the relief angle that changes from the starting point to the end point forms a torsional surface, making it difficult to produce a mold to form the insert. The production of the cutter body is also difficult since a torsional surface must be formed on the base face of the insert pocket in the cutter used to secure the side surface to accommodate the shape of the lower side section of the side surface. Furthermore, it is difficult to have the torsional side surface of the insert and the torsional base face of the insert pocket in the cutter formed so that they can be tightly secured against each other. Since there inevitably will be error in the shapes of the two members, the securing and attachment precision of the insert to the cutter body will be negatively affected, leading to reduced stability in cutting, reduced cutting precision, and the like.

The object of the present invention is to improve cutting precision while making insert production easier, making the machining of the insert pocket easier, improving the stability of the securing performed by the cutter body, and improving attachment precision.

SUMMARY OF THE INVENTION

In order to achieve the object described above, the present invention provides throw-away inserts as described below.

The present invention includes: a throw-away insert comprising: an upper surface (2); a flat bottom surface (3) with four corners; two side surfaces (4,4) formed with upper-side side surfaces (4a) intersecting with the upper surface (2) and lower-side side surfaces (4b) intersecting with one side of a first pair of parallel sides of the bottom surface (3); two end surfaces (5,5), each connected to one side of a second pair of parallel sides of the bottom surface (3); four nose sections ($9_{-1}$-$9_{-4}$) formed at corners of the upper surface (2); a main cutting section (6) formed from a ridge line positioned at an intersection of the side surface (4) and the upper surface (2) and shaped with a gentle curved surface when seen from above; a secondary cutting section (7) formed from a ridge line positioned at an intersection of the end surface (5) and the upper surface (2); and an axial support surface (8) formed from a section of the end surface (5).

The upper-side side surface (4a) is formed as a curved surface with an essentially constant incline angle relative to the bottom surface (3). The lower-side side surface (4b) is formed as a plane with a constant incline angle relative to the bottom surface (3). The upper-side side surface (4a) is projected outward from the lower-side side surface (4b). The "essentially" above indicates that all sections except a small section at the end forms a fixed incline angle.

More preferable structures for this insert will be described below. (1) The lower-side side surface (4b) is formed as a surface at essentially a right angle relative to the axial support surface (8) at a cross-section that is parallel to the bottom surface. (2) The main cutting section (6) is, when seen from above, formed by connecting a plurality of arcs with different radii. (3) A plurality of curves forming the main cutting section (6) are all curves that are parts of a perfect circle. (4) A plurality of curves forming the main cutting section includes at least one curve forming a concave shape when seen from above. The curve of the main cutting section (6) that forms a concave shape when seen from above forms a convex shape when seen from a side view.

The present invention also provides a milling cutter with a throw-away insert (1) mounted in an insert base of insert pocket provided at an outer perimeter at an end of the cutter body (21) wherein: a secondary cutting section (7) that is essentially perpendicular to a main cutting section is positioned at a foremost position and the main cutting section (6) is positioned at an outermost position; an upper-side side surface (4a) on a side involved with cutting serves as a first relief face of the main cutting section (6) and a lower-side side surface (4b) serves as a second relief face of the main cutting section (6); an axial support surface (8) and a lower-side side surface (4b) on a side not involved with cutting are constrained by a cutter body (21); and the throw-away insert (1) so that a path of the main cutting section (6) is parallel to an axial center line (C) of the cutter and the secondary cutting section (7) is oriented with a slope of 0.16 deg-1.5 deg relative to a line perpendicular with the axial center line (C).

In the insert according to the present invention, the lower-side side surface is formed as a flat surface and this surface serves as a radial support surface and is supported by the insert pocket. Thus, the machining precision of the support surface (the insert pocket of the flat surface) and the supported surface (the lower-side side surface of the flat surface) is improved, and the attachment precision and stability is improved.

Also, since the lower-side side surface and the upper-side side surface are formed as surfaces having fixed incline angles relative to the bottom surface, the machining of the molding die and the shaping of powder using the mold are made easier. In addition, the machining of the insert pocket is made easier since there is no need to form torsional surfaces.

Furthermore, changes in the main cutting section can be accommodated by simply changing the amount that the upper-side side surface projects from the lower-side side surface, thus providing design freedom for the main cutting section.

The operations and advantages of the preferable structures (1) through (4) are described in the next section.

BRIEF DESCRIPTION OF THE DRAWINGS

FIG. 10 shows figures for the purpose of describing the operation and advantages when a main cutting section 6 is formed from a curve combining multiple arcs.

DETAILED DESCRIPTION OF THE INVENTION

Figure 1:
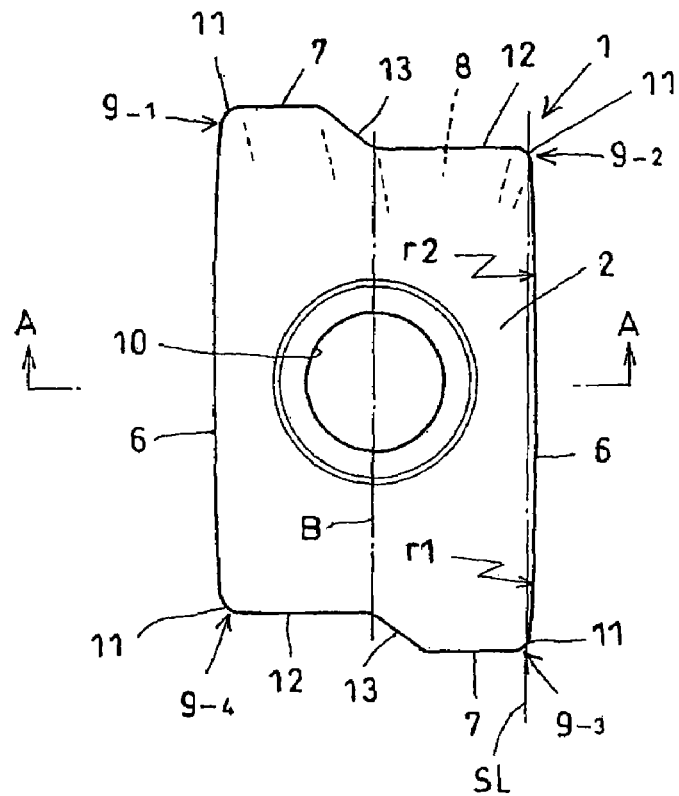
FIG. 1 is a plane drawing showing an example of a throw-away insert according to the present invention.
Figure 2:
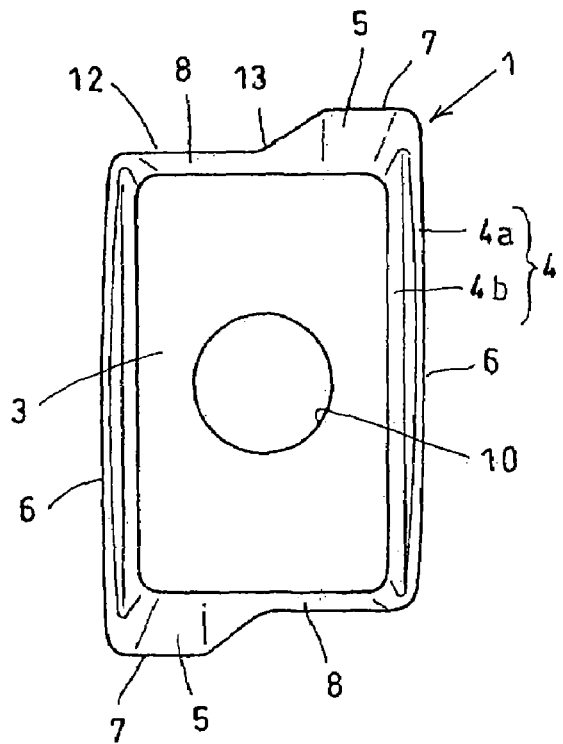
FIG. 2 is a bottom-view drawing of the insert from FIG. 1.
Figure 3:
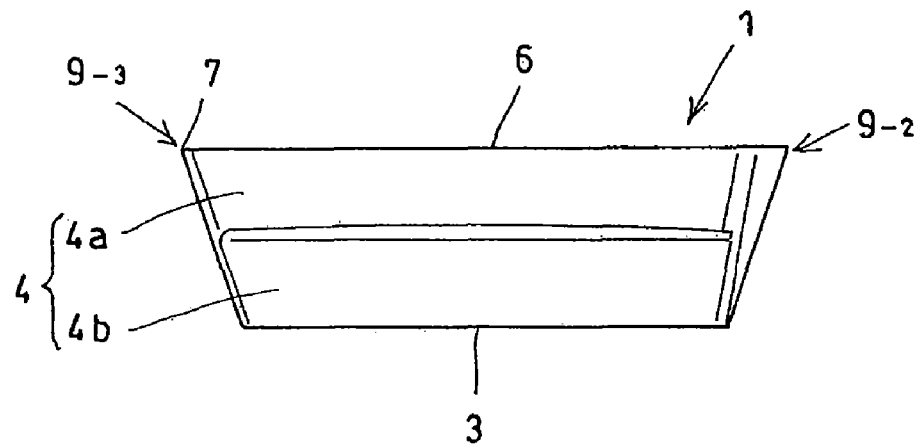
FIG. 3 is a side-view drawing of the insert from FIG. 1.
Figure 4:
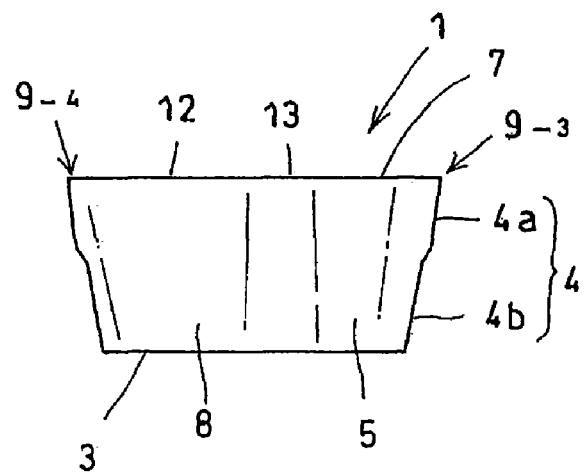
FIG. 4 is an end-view drawing of the insert from FIG. 1.

Referring to FIG. 1 through FIG. 5, an embodiment of a throw-away insert according to the present invention will be described. A throw-away insert 1 shown in the figure includes: an upper surface 2; a flat, roughly rectangular bottom surface 3 formed with four corners (the bottom surface in the figures is roughly rectangular); two side surfaces 4, 4 continuous with two parallel sides of the bottom surface 3; two end surfaces 5, 5 continuous with the other two parallel sides of the bottom surface 3; two long main cutting sections 6, 6; two secondary cutting section 7, 7 provided at two opposing corners; an axial support surface 8 supported by an insert pocket of a cutter body; four nose sections $9_{-1}$-$9_{-4}$ formed at the corners of the upper surface 2 and shaped essentially as right angles when seen from above; and an insert hole 10 for clamping.

Figure 5:
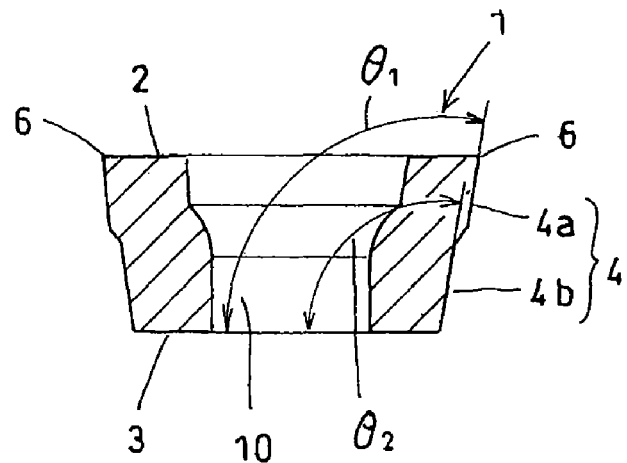
FIG. 5 is a cross-section drawing along the A-A line in FIG. 1.

The side surfaces 4 are combined from an upper-side side surface 4a formed as a curved surface and a lower-side side surface 4b formed as a flat surface. In the side surface provided on the side involved in cutting, the upper-side side surface 4a forms a first relief face of the main cutting section 6 and the lower-side side surface 4b forms a second relief face of the main cutting section 6. Also, the lower-side side surface 4b of the side surface not involved in cutting is used as a radial support surface and is supported in an insert pocket provided in the cutter body. As shown in FIG. 5, the upper-side side surface 4a is sloped relative to the bottom surface 3 at an angle of $\theta 1$, and the lower-side side surface 4b is sloped relative to the bottom surface 3 at an angle of $\theta 2$. The incline angle $\theta 1$ of the upper-side side surface 4a forms the almost same angle for any cross-section except around the nose sections. Similarly, the incline angle $\theta 2$ of the lower-side side surface 4b also forms the same angle for any cross-section except around the nose sections.

As FIG. 5 shows, the upper-side side surface 4a projects outward further than the lower-side side surface 4b. The amount of this projection can be set up as desired. Adjusting the projection makes it possible to handle different shapes for the main cutting section 6.

The upper-side side surface 4a and the end surface 5 both form an acute angle with the upper surface 2. The main cutting section 6 is formed by the ridge line where the upper-side side surface 4a and the upper surface 2 intersect. The secondary cutting section 7 is formed by the ridge line where the end surface 5 and the upper surface 2 intersect.

Also, the axial support surface 8 is formed from a portion of the end surface 5. This axial support surface 8 is positioned away from the end surface 5 where it forms the secondary cutting section 7.

In the insert of this example, the lower-side side surface 4b is formed as a surface that forms essentially a right angle to the axial support surface 8 when seen from a cross-section parallel to the bottom surface. This keeps the machining of the insert pocket from being difficult.

When seen from above, the main cutting section 6 is formed as a curve that combines multiple arcs with different radii. In the main cutting section 6, the side connected to the secondary cutting section 7 is an arcuate curve with a radius r1, and the remaining section is formed as an arcuate curve with a radius r2. This results in a blade that curves gently and projects outward from a line SL parallel to a center line B of the insert extended from the nose sections $9_{-1}$, $9_{-3}$.

Also, when seen from above, the secondary cutting section 7 is formed parallel to the axial support surface 8 and is positioned so that it projects further than the ridge line 12 at the upper end of the axial support surface 8 in the direction of the longer axis of the main cutting section.

In addition, the nose sections $9_{-1}$, $9_{-3}$ are formed by combining the main cutting section 6 and the secondary cutting section 7 and an arcuate nose corner 11. Also, the nose sections $9_{-2}$, $9_{-4}$ are formed by combining the main cutting section 6 and the ridge line 12 at the upper end of the axial support surface 8 and the arcuate nose corner 11. Also, the insert 1 shown in the figure is formed so that the nose sections $9_{-1}$, $9_{-3}$, which are combined from the main cutting section 6 and the secondary cutting section 7, and the nose corner 11, are positioned at diagonal corners. The insert 1 is shaped so that the outline shape does not change when it is turned 180 deg around the center of the insert (the center of the insert hole 10). This makes it possible to replace the blade by changing the corner.

Also, the ridge line 12 and the sloped ridge line 13 between the secondary cutting section 7 and the ridge line 12 function as an intermediate cutting section when the cutter is driven vertically while being driven horizontally.

Figure 6:
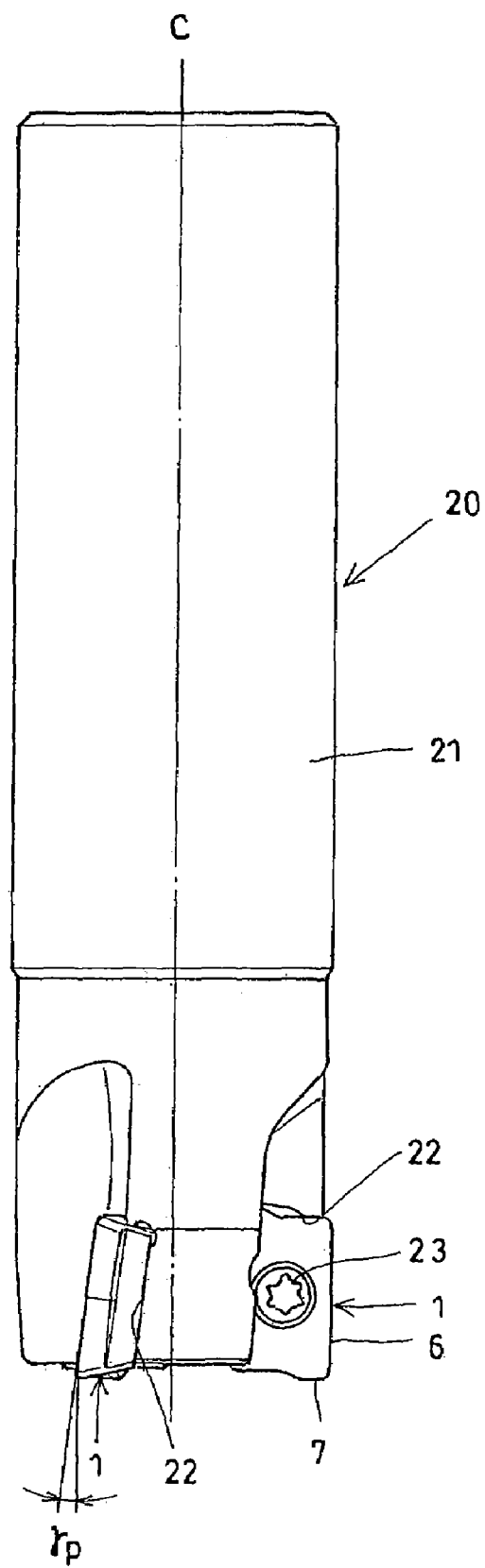
FIG. 6 is a plane-view drawing showing an example of a milling cutter according to the present invention.
Figure 7:
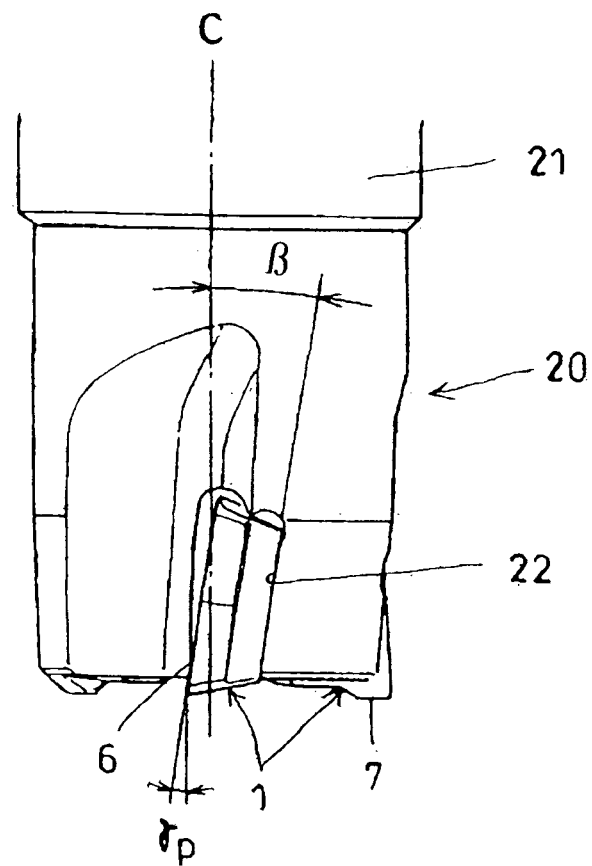
FIG. 7 is a side-view drawing showing the cutter from FIG. 6 rotated 90 degrees.
Figure 8:
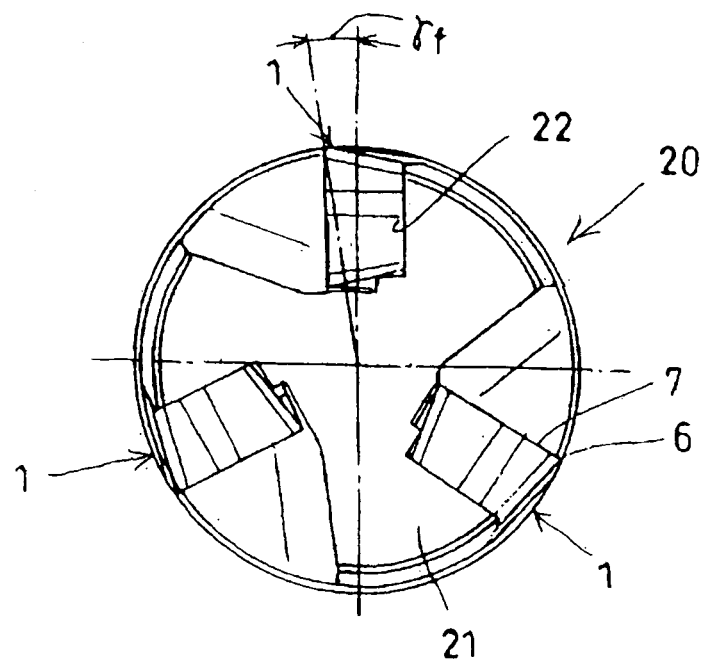
FIG. 8 is a front-view drawing of the cutter from FIG. 6.

FIG. 6 through FIG. 8 show an example of a milling cutter 20 that uses the throw-away insert from FIG. 1. The figures show a cutter body 21. Multiple insert pockets 22 separated by gaps are provided along the outer perimeter of the end of the cutter body 21. The throw-away insert 1 is mounted on the insert pocket 22 by securing it with a clamp screw 23 or the like.

When this is done with the throw-away insert 1, the secondary cutting section 7 is positioned at the very end and the main cutting section 6 is positioned furthest out at the outer perimeter. The upper-side side surface 4a on the side involved in cutting forms the first relief face of the main cutting section 6, and the lower-side side surface 4b forms the second relief face. The axial support surface 8 and the lower-side side surface 4b on the side not involved in cutting are mounted in the cutter body 21 so that they are constrained in the radial direction by the insert pocket 22 of the cutter body 21.

Figure 9:
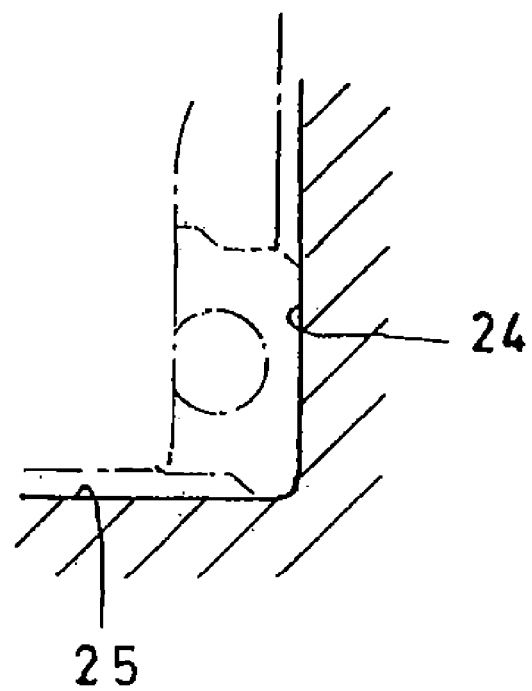
FIG. 9 is a cross-section drawing of a corner.

It can be preferable for the mounting to the insert pocket 22 to be done so that the secondary cutting section 7 is sloped relative to a line L perpendicular to an axis center line C of the cutter with an angle of α=0.16-1.5 deg and so that the axial rake $Y_p$ shown in FIG. 6 is positive and the radial rake $Y_f$ shown in FIG. 8 is negative. When this cutter is used, the main cutting section 6 is able to cut a corner wall surface 24 (see FIG. 9) parallel to the axial center line C of the cutter, and the main cutting section 6 can cut a corner bottom surface 25 (also see FIG. 9) perpendicular to the axial center line C of the cutter.

Figure 10A:
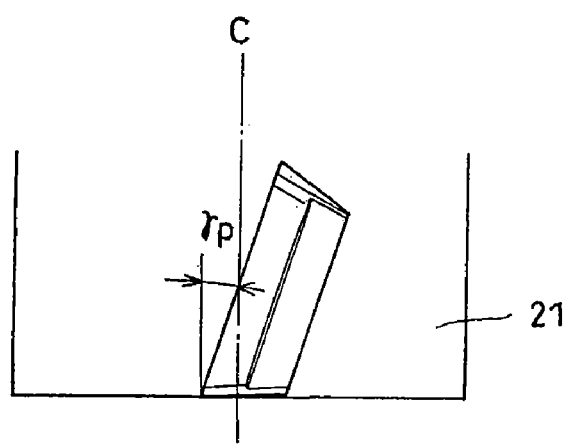
FIG. 10A shows the axial rake.
Figure 10B:
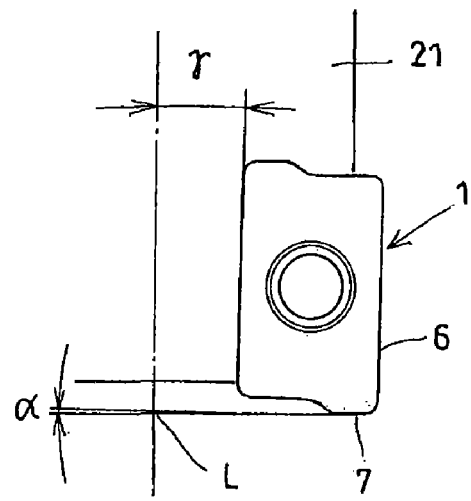
FIG. 10B shows the radial rake.
Figure 10C:
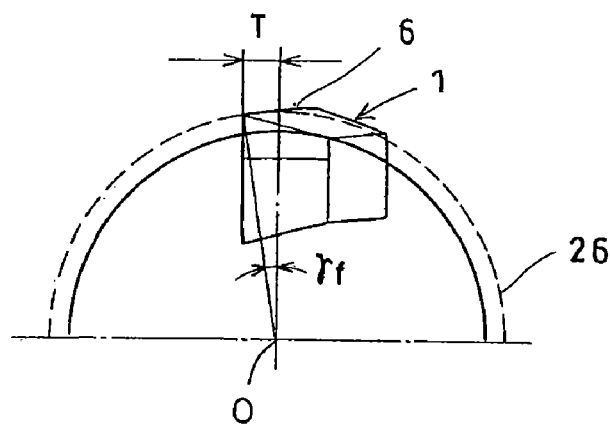
FIG. 10C shows the slope of the main cutting section relative to the axis line of the cutter.
Figure 10D:
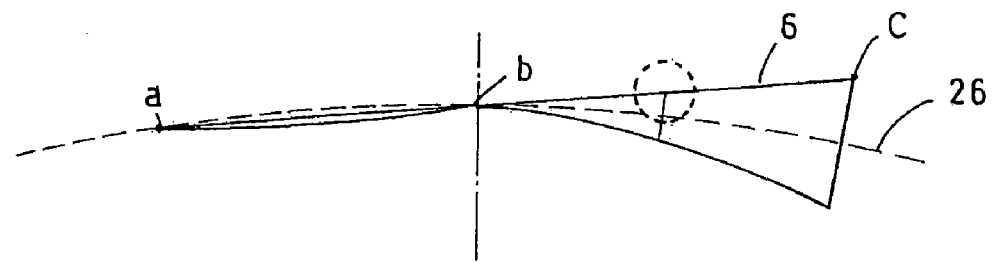
FIG. 10D shows the error of the main cutting section relative to an ideal line.
Figure 11:
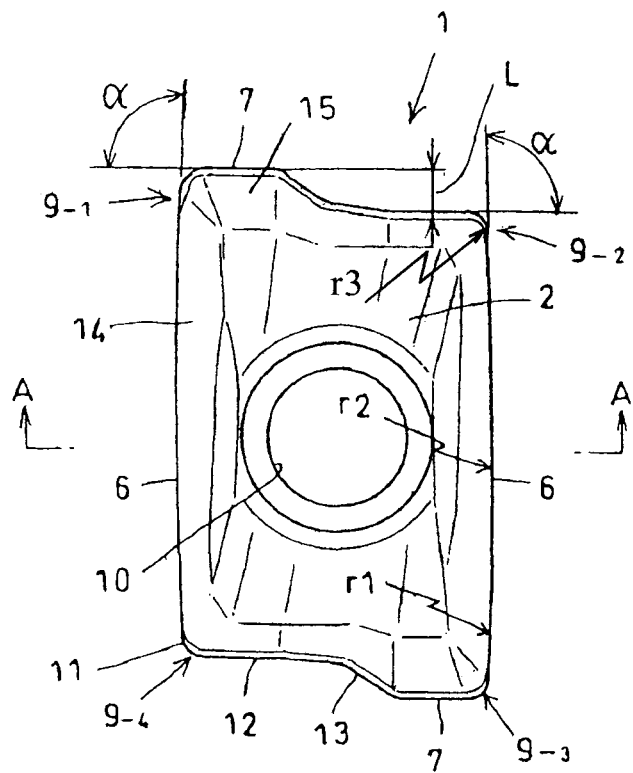
FIG. 11 is a front-view drawing showing another example of a throw-away insert according to the present invention.
Figure 12:
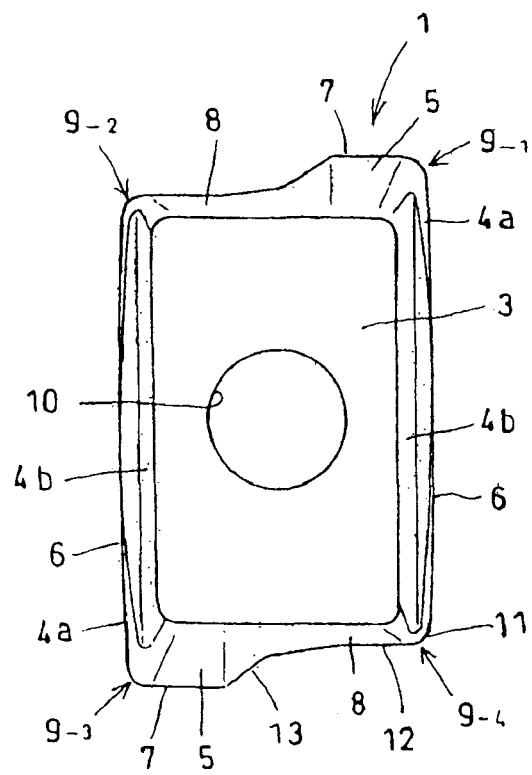
FIG. 12 is a bottom-view drawing of the insert from FIG. 11.

Next, referring to FIG. 10, the operations and advantages of the main cutting section 6 formed as a curve combining multiple arcs will be described. The insert 1 from FIG. 1 is mounted to the cutter body 21 so that: the axial rake $Y_p$ is positive; the radial rake $Y_f$ is negative; the main cutting section 6 is tilted at an angle of Y deg relative to the axial center line C of the cutter; and the secondary cutting section 7 is tilted at an angle of α deg relative to the line L perpendicular to the axial center of the cutter. When, based on a front-view of the cutter (FIG. 10C), the main cutting section 6 is divided into two regions separated by a point b where a line passing through a cutter center O intersects the main cutting section 6, the section of the main cutting section 6 to the front of the point b (the segment from a point a to the point b) is positioned inward from a cutting edge path circle 26 having a radius extending from the cutter center O to the point b. The section to the back of the point b (the range from the point b to a point c) is positioned outward from the path circle 26. As shown in FIG. 10D, if the main cutting section 6 is a straight cutting section, the range from the point a to the point b and the range from the point b to the point c would need correction relative to the path circle 26, which is the ideal line. Since the range from the point a to the point b and the range from the point b to the point c have different errors, effective correction could be provided by dividing the main cutting section 6 into multiple segments along its longitudinal axis and using different arc radii for these segments. In the example of this description, the main cutting section is divided into two regions. However, finer error correction can be provided by increasing the number of segments. This further improves the precision of the right angle for the wall surface 24. Also, by making a curve divided into multiple sections part of a perfect circle, the machining of the molding die and the machining of the insert becomes easier.

FIG. 11 through FIG. 15 show a throw-away insert according to another embodiment. In the throw-away insert 1A, there is a height difference (H1-H2) on the upper surface 2. Also, the height of the lower-side side surface 4b is changed gradually, with the main cutting section 6 curved when seen from above as well as from the side. Furthermore, a region along the upper cutting section 6 of the upper surface 2 and a region along the secondary cutting section 7 are formed with breaker grooves 14, 15 to perform chip handling. These are the aspects that are different from the throw-away insert 1 from FIG. 1. In other aspects, the structure is roughly similar to that of the throw-away insert 1 from FIG. 1. Thus, for these aspects, like elements are assigned like numerals and corresponding descriptions will be omitted.

Figure 13:
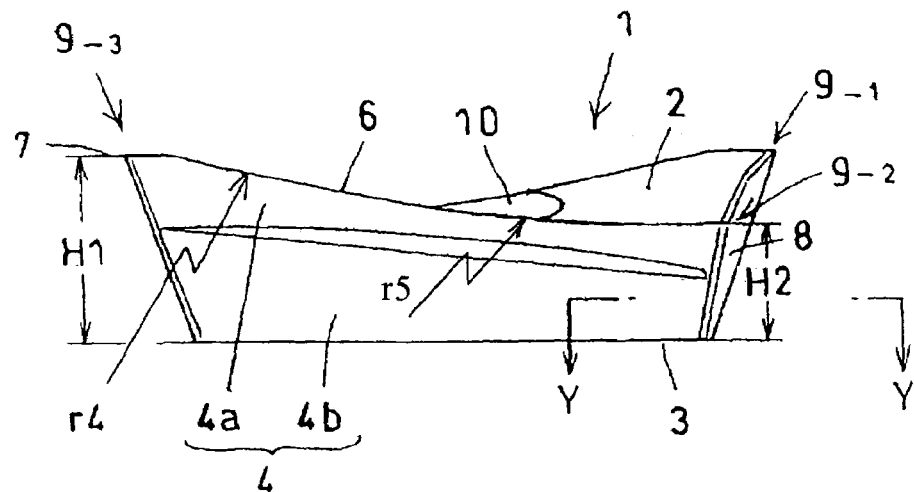
FIG. 13 is a side-view drawing of the insert from FIG. 11.
Figure 14:
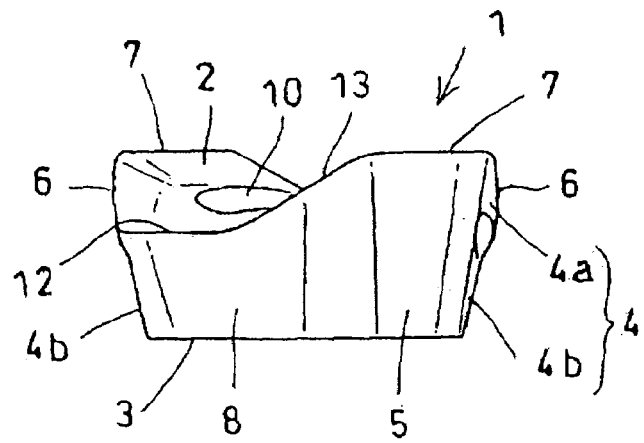
FIG. 14 is an end-view drawing of the insert from FIG. 11.

In the upper surface 2, the nose sections $9_{-1}$, $9_{-3}$, which are at diagonal corners, have the highest positions. The region of the upper surface 2 along the main cutting section 6 forms a downward slope going from the nose section $9_{-1}$ to the nose section $9_{-4}$ as well as from the nose section $9_{-3}$ to the nose section $9_{-2}$. As shown in FIG. 13, this results in the main cutting section 6 forming a blade that is sloped relative to the bottom surface 3 when seen from the side.

Figure 15:
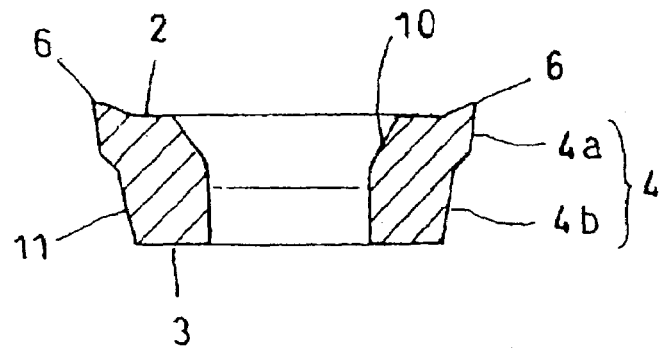
FIG. 15 is a cross-section drawing along the A-A line in FIG. 11.

Also, as in the insert from FIG. 1, in the side surface 4, the upper-side side surface 4a forms an angle of θ1 relative to the bottom surface 3 and the lower-side side surface 4b forms an angle of θ2 relative to the bottom surface 3. The incline angle θ1 of the upper-side side surface 4a and the incline angle θ2 of the lower-side side surface 4b form essentially the same angle at all cross-sections. As shown in FIG. 15, the upper-side side surface 4a projects outward from the lower-side side surface 4b. Adjusting the amount of this projection makes it possible to accommodate changes in the shape of the main cutting section 6.

Figure 16:
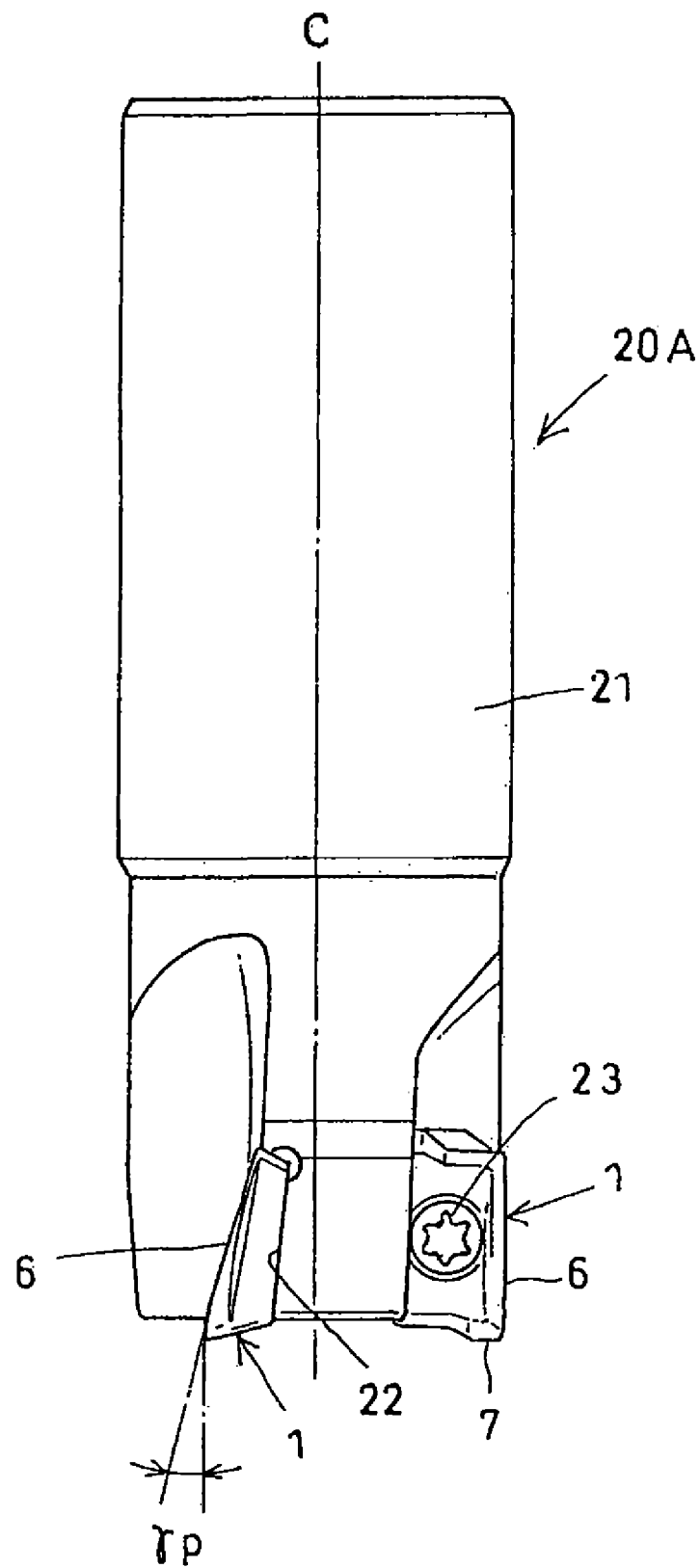
FIG. 16 is a plane-view drawing showing another example of a milling cutter according to the present invention.
Figure 17:
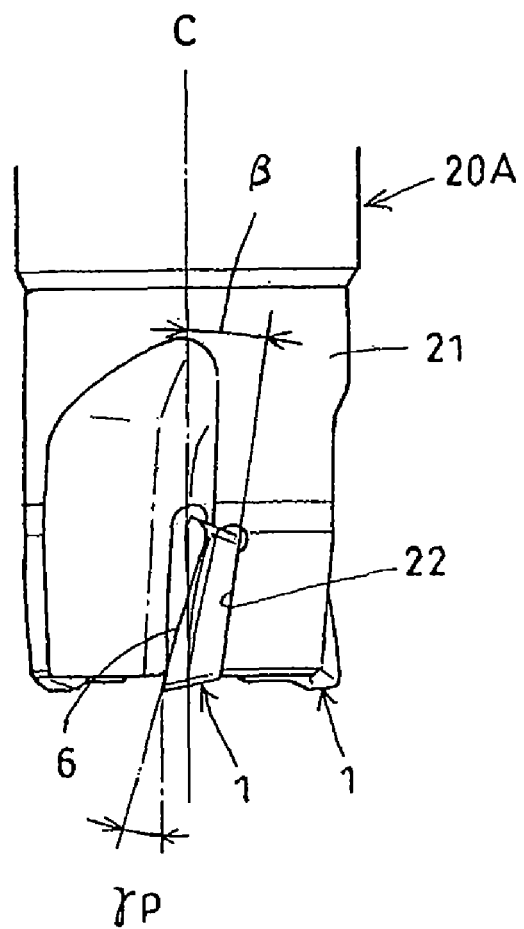
FIG. 17 is a side-view drawing showing the cutter from FIG. 16 rotated 90 degrees.
Figure 18:
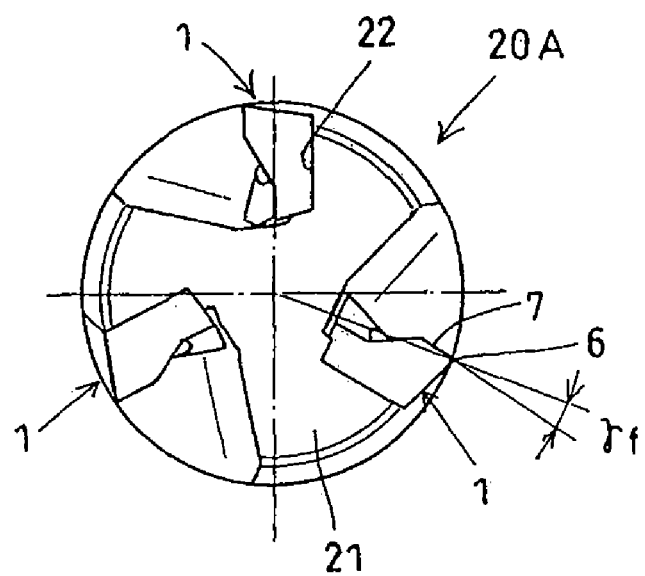
FIG. 18 is a front-view drawing of the cutter from FIG. 16.

FIG. 16 through FIG. 18 show an example of a milling cutter 20A that uses this throw-away insert 1A. The figures shows a cutter body 21. The manner in which the throw-away insert 1A is mounted on the cutter body 21 and the orientation of the insert when mounted is similar to the case with the cutter described with reference to FIG. 6 through FIG. 8, so this description will be omitted.

In the throw-away insert 1A of the second embodiment, the main cutting section 6 is formed as a blade that is sloped relative to the bottom surface 3. Thus, cutting performance can be improved by providing a large, positive axial rake $Y_p$ for the main cutting section 6 without requiring a very large axial slope β(see FIG. 17) for the insert pocket 22 of the cutter body 21.

In the throw-away insert 1A of the embodiment, the lower-side side surface 4b is also formed as a flat surface with no torsion. Since the lower-side side surface 4b and the axial support surface 8 are supported by the insert pocket 22, superior insert attachment precision and support stability are provided.

Also, the main cutting section 6 is formed arcuate when seen from both the top and the side, with a smaller error relative to the ideal line shown in FIG. 10. As a result, the main cutting section 6 can machine corner wall surfaces with improved perpendicular precision. The curvature of the main cutting section 6 is formed, when seen from above the insert, by combining curves with radii r1-r3. When seen from the side of the insert, the curvature is formed by combining curves with radii of r4, r5. The curves r1, r3, r5 are concave curves. The curves r2, r4 are convex curves.

The milling cutter described in the example is an end mill, but the present invention can also be used for a corner milling cutter.

What is claimed is:

1. A throw-away insert comprising: an upper surface; a flat bottom surface with four corners; two side surfaces formed with upper-side side surfaces intersecting with said upper surface and lower-side side surfaces intersecting with said bottom surface; two end surfaces each connected to said upper surface at one end and to said bottom surface at the other end; four nose sections formed at corners of said upper surface; a main cutting section formed from a ridge line positioned at an intersection of said side surface and said upper surface and shaped with a gradual curve when seen from above; a secondary cutting section formed from a ridge line positioned at an intersection of said end surface and said upper surface; and an axial support surface formed from a section of said end surface; wherein: said upper-side side surface is formed as a curved surface with an essentially constant incline angle relative to said bottom surface; said lower-side side surface is formed as a plane with a constant incline angle relative to said bottom surface; said upper-side side surface is projected outward from said lower-side side surface; and said lower-side side surface is formed as a surface at essentially a right angle relative to said axial support surface when viewing the insert perpendicular to the plane of said bottom surface.

2. A throw-away insert according to claim 1 wherein said main cutting section is, when seen from above, formed by connecting a plurality of arcs with different radii.

3. A throw-away insert according to claim 2 further comprising a plurality of arcs forming said main cutting section, wherein the plurality of arcs form a curve of a circle.

4. A throw-away insert according to claim 2 further comprising: a plurality of arcs forming said main cutting section, wherein at least one arc forms a concave shape when seen from a side view; and at least one arc forms a convex shape when seen from the side view.

5. A milling cutter with a throw-away insert according to claim 1 mounted in an insert pocket provided at an outer perimeter at an end of a cutter body further comprising: a secondary cutting section that is essentially perpendicular to a main cutting section is positioned at a foremost position and said main cutting section is positioned at an outermost position; an upper-side side surface on a side involved with cutting serves as a first relief face of said main cutting section and a lower-side side surface serves as a second relief face of said main cutting section; an axial support surface and a lower-side side surface on a side not involved with cutting are constrained by a cutter body; and a path of said main cutting section is parallel to an axial center line of said cutter and said secondary cutting section is oriented with a slope of 0.16 deg-1.5 deg relative to a line perpendicular with said axial center line.

* * * * *